United States Patent
Kurita et al.

(10) Patent No.: US 12,405,589 B2
(45) Date of Patent: Sep. 2, 2025

(54) PROGRAMMABLE LOGIC CONTROLLER, SEQUENCE CONTROL SYSTEM, AND NON-TRANSITORY COMPUTER READABLE MEDIUM

(71) Applicant: Mitsubishi Electric Corporation, Tokyo (JP)

(72) Inventors: Kazuki Kurita, Nagoya (JP); Yoshihiro Nagatomo, Nagoya (JP)

(73) Assignee: MITSUBISHI ELECTRIC CORPORATION, Tokyo (JP)

( * ) Notice: Subject to any disclaimer, the term of this patent is extended or adjusted under 35 U.S.C. 154(b) by 0 days.

(21) Appl. No.: 18/880,285

(22) PCT Filed: Jul. 19, 2022

(86) PCT No.: PCT/JP2022/028025
§ 371 (c)(1),
(2) Date: Dec. 31, 2024

(87) PCT Pub. No.: WO2024/018515
PCT Pub. Date: Jan. 25, 2024

(65) Prior Publication Data
US 2025/0164958 A1    May 22, 2025

(51) Int. Cl.
*G05B 19/05* (2006.01)

(52) U.S. Cl.
CPC .... *G05B 19/05* (2013.01); *G05B 2219/13076* (2013.01)

(58) Field of Classification Search
None
See application file for complete search history.

(56) References Cited

U.S. PATENT DOCUMENTS

| | | | | | |
|---|---|---|---|---|---|
| 4,930,068 | A | * | 5/1990 | Katayose | G06F 13/24 710/261 |
| 2004/0088462 | A1 | * | 5/2004 | Miyake | G06F 9/4812 710/261 |

(Continued)

FOREIGN PATENT DOCUMENTS

| CN | 1577291 A | 2/2005 |
|---|---|---|
| JP | H10-171527 A | 6/1998 |

(Continued)

OTHER PUBLICATIONS

International Search Report and Written Opinion mailed on Oct. 11, 2022, received for PCT Application PCT/JP2022/028025, filed on Jul. 19, 2022, 11 pages including English Translation.

(Continued)

*Primary Examiner* — David Earl Ogg
(74) *Attorney, Agent, or Firm* — XSENSUS LLP

(57) ABSTRACT

In a programmable logic controller, a flag data update receiver receives an update of flag data indicating whether activation of a second execution element is permitted or prohibited. An interrupt receiver receives an interrupt instruction indicating a request for activating the second execution element independently of whether a transition condition is satisfied. An interrupt preventer maintains, when the interrupt instruction is received and latest flag data indicates that the activation of the second execution element is prohibited, an inactive state of the second execution element and outputs an interrupt invalidation error indicating that the interrupt instruction is invalidated. An executor activates the second execution element when the interrupt instruction is received and the latest flag data indicates that the activation of the second execution element is permitted.

18 Claims, 7 Drawing Sheets

(56) References Cited

U.S. PATENT DOCUMENTS

2008/0046621 A1\* 2/2008 Okino .................. G06F 9/4812
  710/260
2009/0158260 A1 6/2009 Moon et al.

FOREIGN PATENT DOCUMENTS

| JP | 2003-280923 A | 10/2003 |
| JP | 2006-099331 A | 4/2006 |
| KR | 20130137478 A \* | 12/2013 |

OTHER PUBLICATIONS

Office Action dated Jun. 10, 2025, issued for the corresponding CN patent application No. 1 English translation, 17pp.

\* cited by examiner

PROGRAMMABLE LOGIC CONTROLLER, SEQUENCE CONTROL SYSTEM, AND NON-TRANSITORY COMPUTER READABLE MEDIUM

CROSS-REFERENCE TO RELATED APPLICATION

This application is a national stage application, pursuant to 35 U.S.C. § 371, of International Patent Application No. PCT/JP2022/028025, filed Jul. 19, 2022, the entire contents of which are incorporated herein by reference.

TECHNICAL FIELD

The present disclosure relates to a programmable logic controller, a sequence control system, and an active state control program.

BACKGROUND ART

A known programmable logic controller (PLC) controls devices that are involved in manufacturing on a production line. The PLC executes a sequence program to control the devices.

The sequence program is written in a known programming language such as the sequential function chart. The sequence program written in the sequential function chart includes elements called steps and elements called transitions.

The steps describe actions for a control target. The transitions describe transition conditions for transition from a preceding step (hereafter referred to as a first step) to the step immediately after the first step (hereafter referred to as a second step).

A step includes two states, or an active state and an inactive state. The step in the active state refers to the step being performed. The step in the inactive state refers to the step not being performed. When a transition condition defined in a transition is satisfied, the active state switches from the first step to the second step.

Patent Literature 1 describes a PLC that can maintain the inactive state of the second step to allow debugging the second step. The PLC includes flag data indicating whether activation of the second step is permitted or prohibited, and maintains the inactive state of the second step when the transition condition is satisfied but the flag data indicates that the activation of the second step is prohibited.

CITATION LIST

Patent Literature

Patent Literature 1: Unexamined Japanese Patent Application Publication No. H10-171527

SUMMARY OF INVENTION

Technical Problem

An execution element hereafter refers to an element defining, in the sequence program, one or more associated actions for the control target. The step is an example of the execution element. A transition condition element hereafter refers to an element defining a transition condition for transition from an execution element to the next execution element. The transition is an example of the transition condition element.

The execution element can be activated by a factor other than the transition condition being satisfied. More specifically, the execution element can be activated by an interrupt instruction indicating a request for forcibly activating the execution element independently of whether the transition condition is satisfied.

Examples of the interrupt instruction include an external interrupt request that is the request to the PLC from outside the PLC and an internal interrupt request that is the request generated internally in the PLC.

The technique in Patent Literature 1 can prevent activation of the execution element due to the transition condition being satisfied, but cannot prevent activation of the execution element due to the interrupt instruction. The execution element that defines an action for a device may be activated by the interrupt instruction during maintenance of the device, and may cause a failure in the device. Under such circumstances, a technique is awaited for maintaining the inactive state of the execution element when the interrupt instruction is generated.

An objective of the present disclosure is to provide a programmable logic controller, a sequence control system, and an active state control program that can maintain the inactive state of an execution element when an interrupt instruction is generated.

Solution to Problem

A programmable logic controller according to an aspect of the present disclosure executes a sequence program including a first execution element defining a preceding action, a second execution element defining a subsequent action to be performed subsequently to the preceding action, and a transition condition element defining a transition condition for transition of an active state from the first execution element to the second execution element. The programmable logic controller includes a flag data update receiver to receive an update of flag data indicating whether activation of the second execution element is permitted or prohibited, an interrupt receiver to receive an interrupt instruction indicating a request for activating the second execution element independently of whether the transition condition is satisfied, an interrupt preventer to refer to latest flag data when the interrupt receiver receives the interrupt instruction, and to maintain, when the flag data indicates that the activation of the second execution element is prohibited, an inactive state of the second execution element and output an interrupt invalidation error indicating that the interrupt instruction is invalidated, and an executor to activate the second execution element when the interrupt receiver receives the interrupt instruction and the latest flag data indicates that the activation of the second execution element is permitted.

Advantageous Effects of Invention

The above structure can maintain the inactive state of the second execution element when the interrupt instruction is generated but the flag data indicates that the activation of the second execution element is prohibited.

DESCRIPTION OF EMBODIMENTS

Figure 1:
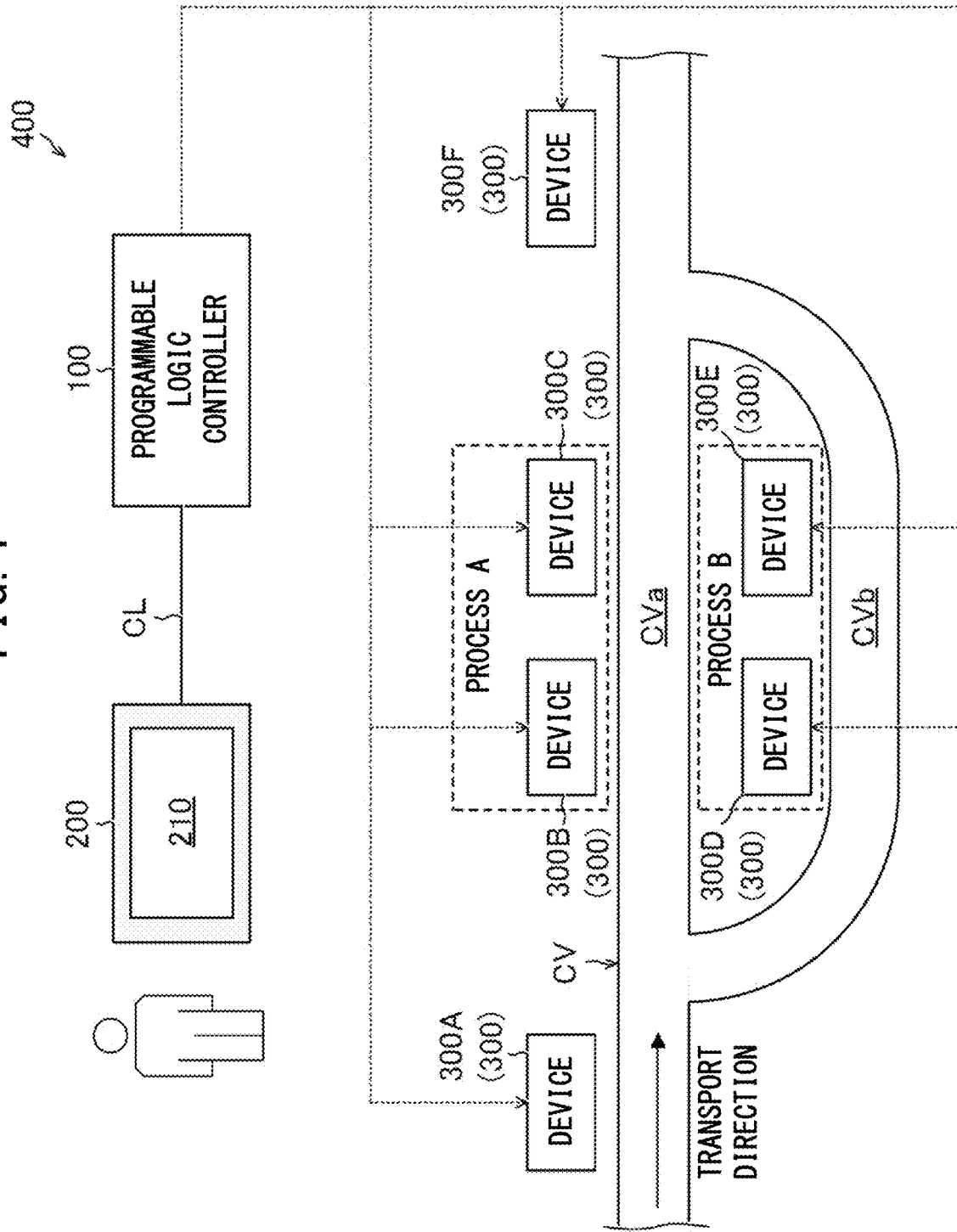
FIG. 1 is a conceptual diagram of a sequence control system according to an embodiment.

A sequence control system according to an embodiment is described below with reference to the drawings. Like reference signs denote like or corresponding components in the drawings.

As illustrated in FIG. 1, a sequence control system 400 according to the present embodiment includes multiple devices 300 involved in manufacturing on a production line, a programmable logic controller (PLC) 100 that controls the devices 300, and a programmable display 200 connected to the PLC 100 through a communication line CL.

FIG. 1 illustrates devices 300A to 300F among the multiple devices 300. The devices 300A to 300F are arranged along a conveyor CV that transports a workpiece. The workpiece herein includes a semifinished product under manufacturing and a component included in a product. Each of the devices 300A to 300F performs processing of the workpiece, such as attaching other components to, machining, marking, inspecting, or packaging the workpiece.

The conveyor CV includes a main line CVa and a selection line CVb arranged parallel to the main line CVa. The selection line CVb has, in a direction in which the workpiece is transported, an upstream end that branches from the main line CVa. The selection line CVb has, in the direction in which the workpiece is transported, a downstream end that merges with the main line CVa.

The device 300A, the device 300B, the device 300C, and the device 300F are arranged in this order along the main line CVa. The device 300D and the device 300E are arranged in this order along the selection line CVb.

A manufacturing process performed by the device 300B and the device 300C is hereafter referred to as a process A, and a manufacturing process performed by the device 300D and the device 300E as a process B. The process A and the process B are performed alternatively. In other words, when the device 300B and the device 300C operate, the device 300D and the device 300E stop. When the device 300D and the device 300E operate, the device 300B and the device 300C stop.

The programmable display 200 functions as a human machine interface for the PLC 100. In other words, the programmable display 200 is an example of a human machine device in an aspect of the present disclosure.

The programmable display 200 includes a display screen 210 that serves as a graphical user interface. The display screen 210 is a touchscreen. A user operates the display screen 210 in the programmable display 200 to control the devices 300 and the conveyor CV through the PLC 100.

More specifically, the user can operate the display screen 210 in the programmable display 200 in the present embodiment to instruct the PLC 100 to switch from a state in which the process A is performed to a state in which the process B is performed and to switch from the state in which the process B is performed to the state in which the process A is performed. The PLC 100 controls the device 300B and the device 300C, the device 300D and the device 300E, and the conveyor CV based on the above instructions.

The structure of the PLC 100 is described in detail below with reference to FIG. 2.

Figure 2:
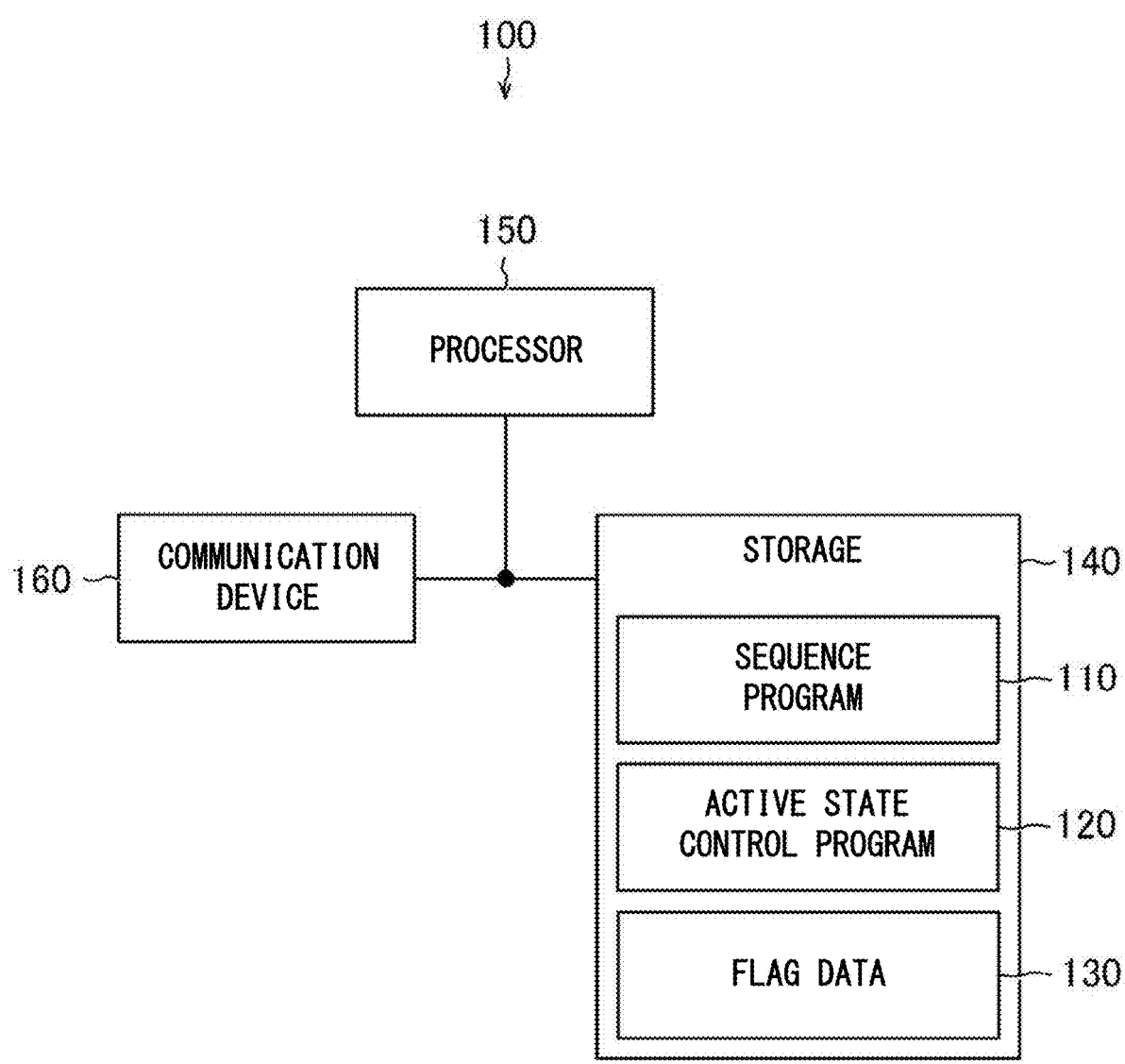
FIG. 2 is a conceptual block diagram of a programmable logic controller (PLC) according to the embodiment.

As illustrated in FIG. 2, the PLC 100 includes a communication device 160 that communicates with external devices. The communication device 160 receives instructions from the programmable display 200 and transmits control commands to the devices 300.

The PLC 100 also includes a storage 140 that stores a sequence program 110 defining a procedure for controlling the devices 300 and the conveyor CV. The PLC 100 also includes a processor 150 that executes the sequence program 110. The processor 150 executes the sequence program 110 to control the devices 300 and the conveyor CV.

The structure of the sequence program 110 is described below with reference to FIG. 3.

Figure 3:
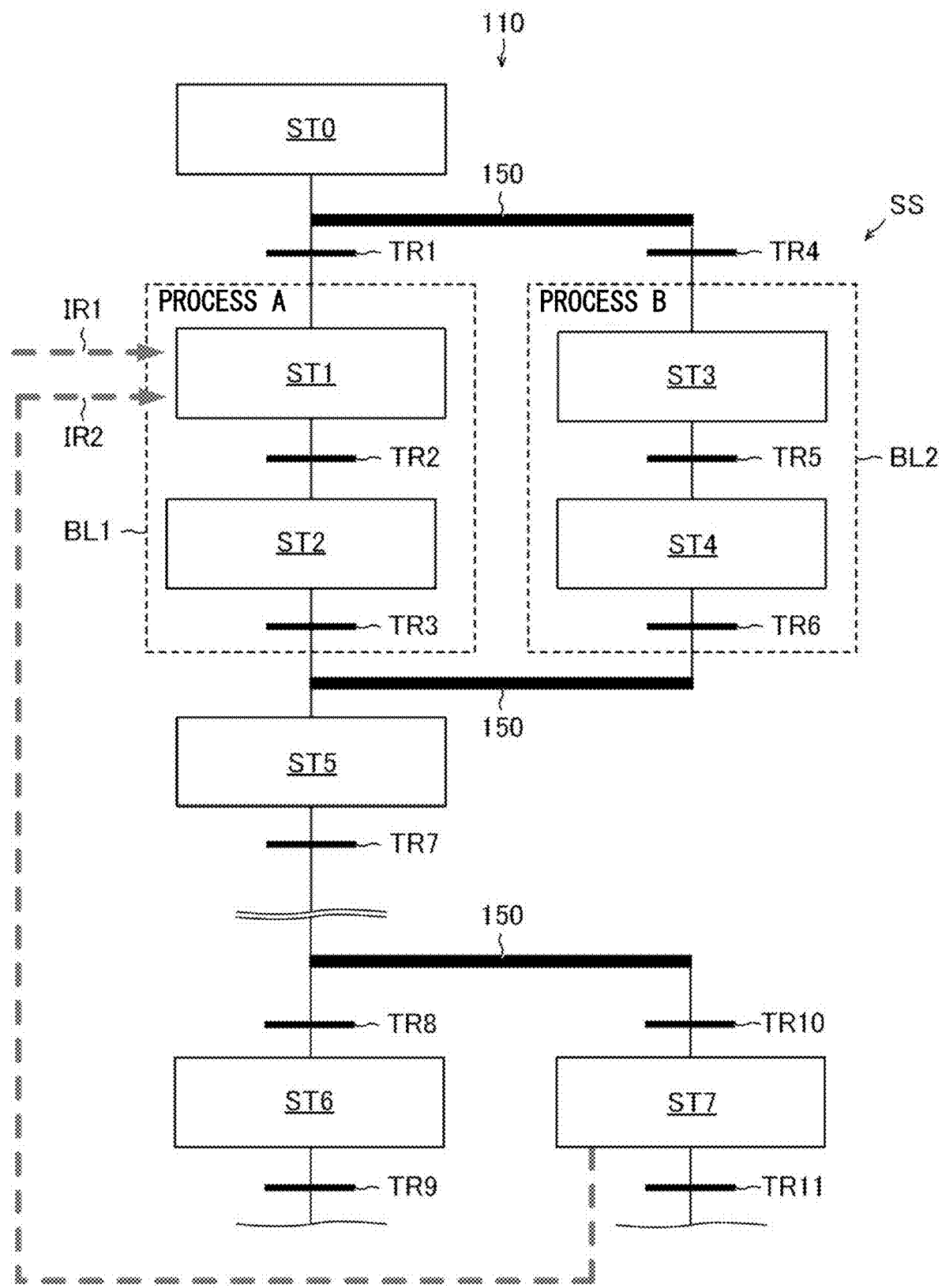
FIG. 3 is a conceptual diagram of a sequence program according to the embodiment.

FIG. 3 illustrates the structure of the sequence program 110 written in the sequential function chart. The sequence program 110 includes steps ST0 to ST7 and transitions TR1 to TR11.

The steps ST0, ST1, ST2, ST3, ST4, and ST5 define control actions for the respective devices 300A, 300B, 300C, 300D, 300E, and 300F illustrated in FIG. 1.

The transition TR1 defines a transition condition for transition of an active state from the step ST0 to the step ST1. Similarly, the transition TR2 defines the transition condition for transition of the active state from the step ST1 to the step ST2. The same applies to the other transitions TR3 to TR11.

The steps ST1 and ST2 and the transitions TR2 and TR3 are included in a block BL1 that defines the action to perform the process A illustrated in FIG. 1. The steps ST3 and ST4 and the transitions TR5 and TR6 are included in a block BL2 that defines the action to perform the process B illustrated in FIG. 1.

In the structure described above, the step ST0 being the initial step is an example of a first execution element that defines the action for the device 300A as a preceding action. The block BL1 is an example of a second execution element that defines the actions for the devices 300B and 300C as subsequent actions performed subsequently to the preceding action. The transition TR1 is an example of a transition condition element that defines the transition condition for transition of the active state from the first execution element to the second execution element.

The blocks BL1 and BL2 are included in a selection sequence SS in which the blocks BL1 and BL2 are activated alternatively. In other words, the block BL2 is an example of a branch execution element that is activated alternatively to the second execution element.

The issues to be solved with the structure according to the present embodiment are described below.

The user may operate the display screen 210 in the programmable display 200 illustrated in FIG. 1 to perform the process B among the process A and the process B. In this case, in FIG. 3, the steps ST3 and ST4 in the block BL2 are sequentially activated when the transition condition defined in the transition TR4 is satisfied after the step ST0. In contrast, the steps ST1 and ST2 in the block BL1 remain in an inactive state.

With the block BL1 remaining in the inactive state as described above, the devices 300B and 300C that perform the process A stop in FIG. 1. This allows maintenance of the devices 300B and 300C while the process B is being performed. In other words, the selection line CVb arranged parallel to the main line CVa allows maintenance of the devices 300B and 300C without stopping the manufacture of products.

However, at a manufacturing site, a user other than the user who has previously operated the display screen 210 to perform the process B may operate the display screen 210 to perform the process A (hereafter referred to as a switching operation) without noticing the above maintenance being performed.

In this case, the programmable display 200 that receives the switching operation provides, to the PLC 100, an external interrupt instruction IR1 to activate the step ST1 illustrated in FIG. 3. The external interrupt instruction IR1 indicates a request for forcibly activating the step ST1 independently of whether the transition condition defined in the transition TR1 is satisfied.

This causes the steps ST1 and ST2 in the block BL1 to be sequentially activated. In other words, in FIG. 1, the devices 300B and 300C that are under maintenance each receive a control command, and may be activated.

The activation during maintenance may cause failures in the devices 300B and 300C. A technique is thus awaited for preventing the activation of the step ST1 due to the external interrupt instruction IR1 and allowing secure maintenance of the devices 300B and 300C.

Additionally, the user may accidentally start the maintenance of the devices 300B and 300C that perform the process A without operating the display screen 210 illustrated in FIG. 1 to perform the process B. In this case, when the transition condition defined in the transition TR1 is satisfied in FIG. 3, the step ST1 is activated.

When the step ST1 is activated, the device 300B illustrated in FIG. 1 under maintenance may be activated and cause failures in the device 300B and the device 300C. A technique is thus awaited for preventing the activation of the step ST1 due to the transition condition defined in the transition TR1 being satisfied and allowing secure maintenance of the devices 300B and 300C.

The devices 300B and 300C may also be activated by an internal interrupt during maintenance. This is described below.

In FIG. 3, the step ST7 includes an activation code describing the activation of the step ST1. In other words, the step ST7 is an example of a calling execution element in an aspect of the present disclosure.

In this case, when the step ST7 is activated, the above activation code is executed to generate an internal interrupt instruction IR2 requesting the activation of the step ST1. Similarly to the external interrupt instruction IR1, the internal interrupt instruction IR2 indicates a request for forcibly activating the step ST1 independently of whether the transition condition defined in the transition TR1 is satisfied.

Thus, the devices 300B and 300C can be activated when the step ST7 is activated during maintenance of the devices 300B and 300C illustrated in FIG. 1. This may also cause failures in the devices 300B and 300C. A technique is thus awaited for preventing the activation of the step ST1 due to the internal interrupt instruction IR2 and allowing secure maintenance of the devices 300B and 300C.

The external interrupt instruction IR1 and the internal interrupt instruction IR2 are collectively referred to as interrupt instructions. The interrupt instructions are each a request for forcibly activating a specific step independently of whether the transition condition defined in the transition TR1 is satisfied.

The PLC 100 according to the present embodiment has a structure responding to the issues described above. The structure is described below.

As illustrated in FIG. 2, the storage 140 in the PLC 100 also stores an active state control program 120 and flag data 130.

The flag data 130 indicates whether activation of the block BL1 illustrated in FIG. 3 is to be permitted or prohibited. The activation of the block BL1 herein refers to activation of the steps ST1 and ST2 included in the block BL1.

The active state control program 120 defines a procedure for controlling, based on the indication in the flag data 130, whether to permit or prevent the activation of the block BL1 due to (I) the transition condition defined in the transition TR1 being satisfied, (II) the external interrupt instruction IR1, or (III) the internal interrupt instruction IR2.

The user at the manufacturing site can update the flag data 130 using the programmable display 200 illustrated in FIG. 1. In other words, the user can rewrite the flag data 130 as appropriate to indicate that the activation of the block BL1 is permitted or to indicate that the activation of the block BL1 is prohibited by operating the display screen 210 in the programmable display 200.

The functions implemented by the processor 150 illustrated in FIG. 2 executing the active state control program 120 are described in detail below with reference to FIG. 4.

Figure 4:
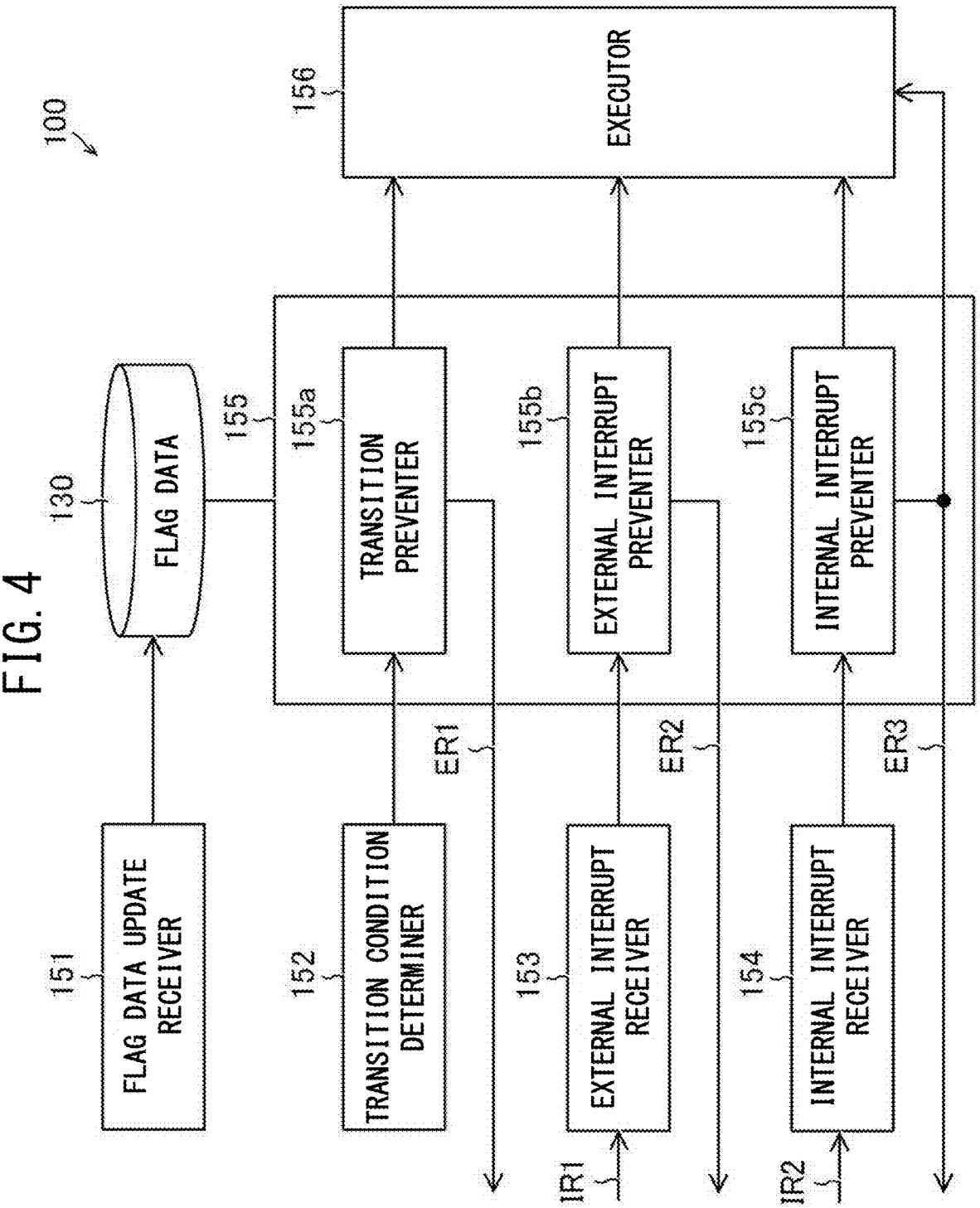
FIG. 4 is a functional conceptual diagram of the PLC according to the embodiment.

As illustrated in FIG. 4, the PLC 100 functions as a flag data update receiver 151 that receives an update of the flag data 130.

As described above, the user can operate the programmable display 200 illustrated in FIG. 1 to update, as appropriate, the flag data 130 indicating whether the block BL1 illustrated in FIG. 3 can be activated. The programmable display 200 instructs the PLC 100 to update the flag data 130 in real time based on the user operation. The flag data update receiver 151 receives the update instruction from the programmable display 200 and updates the flag data 130 based on the instruction.

The PLC 100 also functions as a transition condition determiner 152 that determines whether the transition condition for transition to the above block BL1 is satisfied. In FIG. 3, after an action defined in the step ST0 is performed, the transition condition determiner 152 determines whether the transition condition defined in the transition TR1 is satisfied.

The PLC 100 also functions as an external interrupt receiver 153 that receives the external interrupt instruction IR1. As described above, the programmable display 200 that has received the switching operation indicating a switch from performing the process B to performing the process A provides the external interrupt instruction IR1 to the PLC 100. The external interrupt receiver 153 receives the external interrupt instruction IR1 from the programmable display 200.

The PLC 100 also functions as an internal interrupt receiver 154 that receives the internal interrupt instruction IR2. As described above, the internal interrupt instruction IR2 indicates the activation of the block BL1 through execution of the activation code included in the step ST7 illustrated in FIG. 3 when the step ST7 is activated.

The PLC 100 also functions as an executor 156 that performs the steps ST0 to ST7 in the sequence program 110 illustrated in FIG. 3. Performing the steps ST0 to ST7 herein refers to outputting, to the devices 300, a control command corresponding to each of the actions defined in the steps ST0 to ST7.

The PLC 100 also functions as a preventer 155 that prevents the activation of the block BL1 when the flag data 130 indicates that the activation of the block BL1 is prohibited. The preventer 155 includes a transition preventer 155*a*, an external interrupt preventer 155*b*, and an internal interrupt preventer 155*c*.

The transition preventer 155*a* first refers to the latest flag data 130 when the transition condition determiner 152 determines that the transition condition in the transition TR1 is satisfied. When the flag data 130 indicates that the activation of the block BL1 is prohibited, the transition preventer 155*a* maintains the active state of the step ST0 illustrated in FIG. 3 to prevent the activation of the block BL1.

When preventing the activation of the block BL1, the transition preventer 155*a* outputs a transition invalidation error ER1 indicating that the activation of the block BL1 is prevented to the programmable display 200. Upon receiving the transition invalidation error ER1, the programmable display 200 causes the display screen 210 to indicate that the activation of the block BL1 is prevented.

When the external interrupt receiver 153 receives the external interrupt instruction IR1, the external interrupt preventer 155*b* first refers to the latest flag data 130. When the flag data 130 indicates that the activation of block BL1 is prohibited, the external interrupt preventer 155*b* maintains the inactive state of the block BL1.

When maintaining the inactive state of the block BL1, the external interrupt preventer 155*b* outputs an external interrupt invalidation error ER2 indicating that the external interrupt instruction IR1 is invalidated to the programmable display 200 that is the source of the external interrupt instruction IR1. Upon receiving the external interrupt invalidation error ER2, the programmable display 200 causes the display screen 210 to indicate that the operation to switch from the process B to the process A is invalidated.

When the internal interrupt receiver 154 receives the internal interrupt instruction IR2, the internal interrupt preventer 155*c* first refers to the latest flag data 130. When the flag data 130 indicates that the activation of the block BL1 is prohibited, the internal interrupt preventer 155*c* maintains the inactive state of the block BL1.

The internal interrupt preventer 155*c* outputs an internal interrupt invalidation error ER3 indicating that the internal interrupt instruction IR2 is invalidated to the programmable display 200 and the executor 156. Upon receiving the internal interrupt invalidation error ER3, the programmable display 200 causes the display screen 210 to indicate that the activation of the block BL1 is prevented and that the step ST7 is not performed. Upon receiving the internal interrupt invalidation error ER3, the executor 156 does not perform the step ST7.

When the flag data 130 indicates that the activation of block BL1 is permitted, the transition preventer 155*a*, the external interrupt preventer 155*b*, and the internal interrupt preventer 155*c* each transmit an instruction to permit the activation of the block BL1 to the executor 156.

The executor 156 activates the block BL1 when the executor 156 receives the instruction to permit the activation of the block BL1 from (i) the transition preventer 155*a*, (ii) the external interrupt preventer 155*b*, or (iii) the internal interrupt preventer 155*c*.

The external interrupt receiver 153 and the internal interrupt receiver 154 are collectively referred to as interrupt receivers. The external interrupt preventer 155*b* and the internal interrupt preventer 155*c* are collectively referred to as interrupt preventers. The interrupt receivers receive the interrupt instructions. When an interrupt receiver receives an interrupt instruction, an interrupt preventer first refers to the latest flag data 130. When the flag data 130 indicates that the activation of block BL1 is prohibited, the interrupt preventer maintains the inactive state of the block BL1 and outputs an interrupt invalidation error to the programmable display 200 and the executor 156.

The operation of the PLC 100 for determining whether to activate the execution element is described below with reference to FIGS. 5 to 7. The execution element that is a target of the determination as to whether to perform the activation is hereafter referred to as a target execution element. As illustrated in FIG. 3, the block BL1 is the target execution element in the present embodiment.

In this example, the flag data 130 indicating whether to activate the target execution element is updated to the latest data in advance by the user of the programmable display 200. In other words, the flag data update receiver 151 receives the update instruction from the programmable display 200 and updates the flag data 130 based on the instruction.

Figure 5:
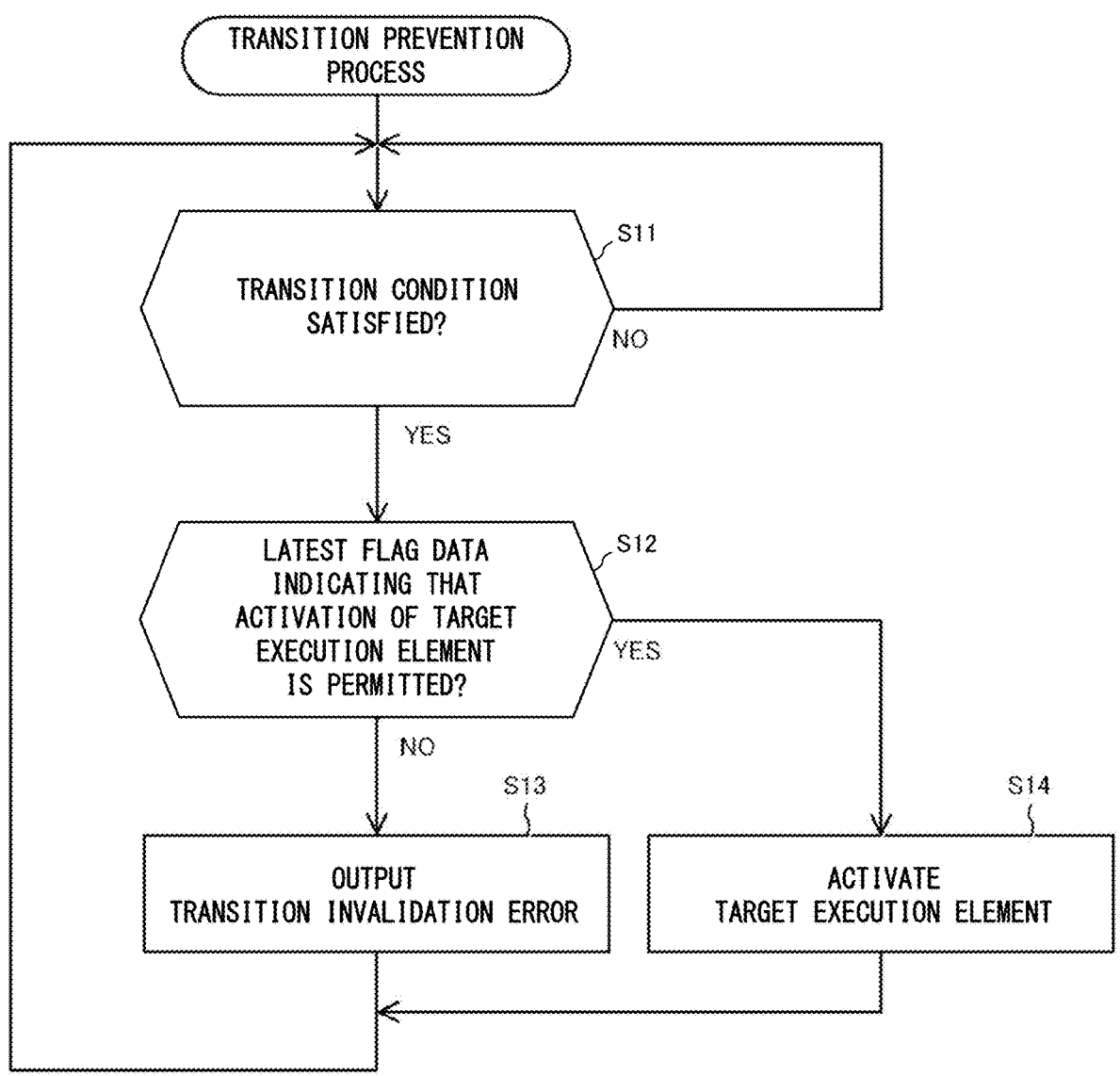
FIG. 5 is a flowchart of a transition prevention process in the embodiment.

A transition prevention process for preventing activation of the target execution element due to the transition condition being satisfied is described first with reference to FIG. 5.

As illustrated in FIG. 5, the transition condition determiner 152 first determines whether the transition condition defined in the transition TR1 is satisfied (step S11). When the transition condition is not satisfied (No in step S11), the processing returns to step S11.

When the transition condition is satisfied (Yes in step S11), the transition preventer 155*a* determines whether the latest flag data 130 indicates that the activation of the block BL1 being the target execution element is permitted (step S12).

When the latest flag data 130 indicates that the activation of the target execution element is prohibited (No in step S12), the transition preventer 155*a* maintains the active state of the step ST0 that is the execution element preceding the target execution element to prevent the activation of the target execution element. The transition preventer 155*a* also outputs the transition invalidation error ER1 indicating that the activation of the target execution element is prevented to the programmable display 200 (step S13).

In contrast, when the latest flag data 130 indicates that the activation of the target execution element is permitted (Yes in step S12), the executor 156 activates the block BL1 that is the target execution element (step S14). After steps S13 and S14, the processing returns to step S11 again.

An external interrupt prevention process for preventing the activation of the target execution element due to the external interrupt instruction IR1 is now described with reference to FIG. 6.

Figure 6:
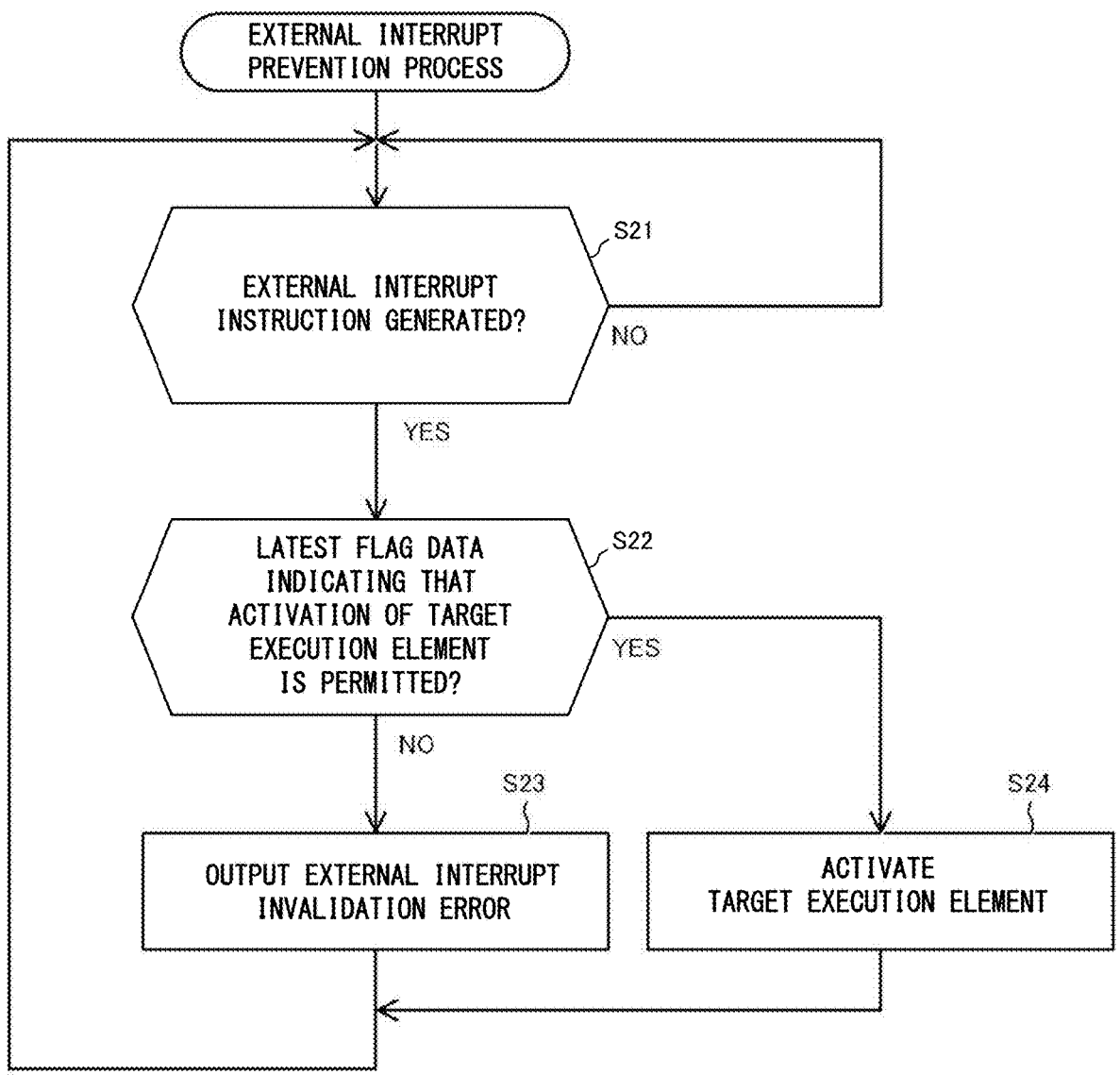
FIG. 6 is a flowchart of an external interrupt prevention process in the embodiment.

As illustrated in FIG. 6, the external interrupt receiver 153 constantly determines whether the external interrupt instruction IR1 is generated (step S21). When no external interrupt instruction IR1 is generated (No in step S21), the processing returns to step S21.

When the external interrupt instruction IR1 is generated (Yes in step S21), the external interrupt receiver 153 receives the external interrupt instruction IR1. The external interrupt preventer 155*b* then determines whether the latest flag data 130 indicates that the activation of the block BL1 being the target execution element is permitted (step S22).

When the latest flag data 130 indicates that the activation of the target execution element is prohibited (No in step S22), the external interrupt preventer 155*b* maintains the inactive state of the block BL1 that is the target execution element. The external interrupt preventer 155b also outputs the external interrupt invalidation error ER2 indicating that the external interrupt instruction IR1 is invalidated to the programmable display 200 (step S23).

In contrast, when the latest flag data 130 indicates that the activation of the target execution element is permitted (Yes in step S22), the executor 156 activates the block BL1 that is the target execution element (step S24). After steps S23 and S24, the processing returns to step S21 again.

An internal interrupt prevention process for preventing the activation of the target execution element due to the internal interrupt instruction IR2 is now described with reference to FIG. 7.

Figure 7:
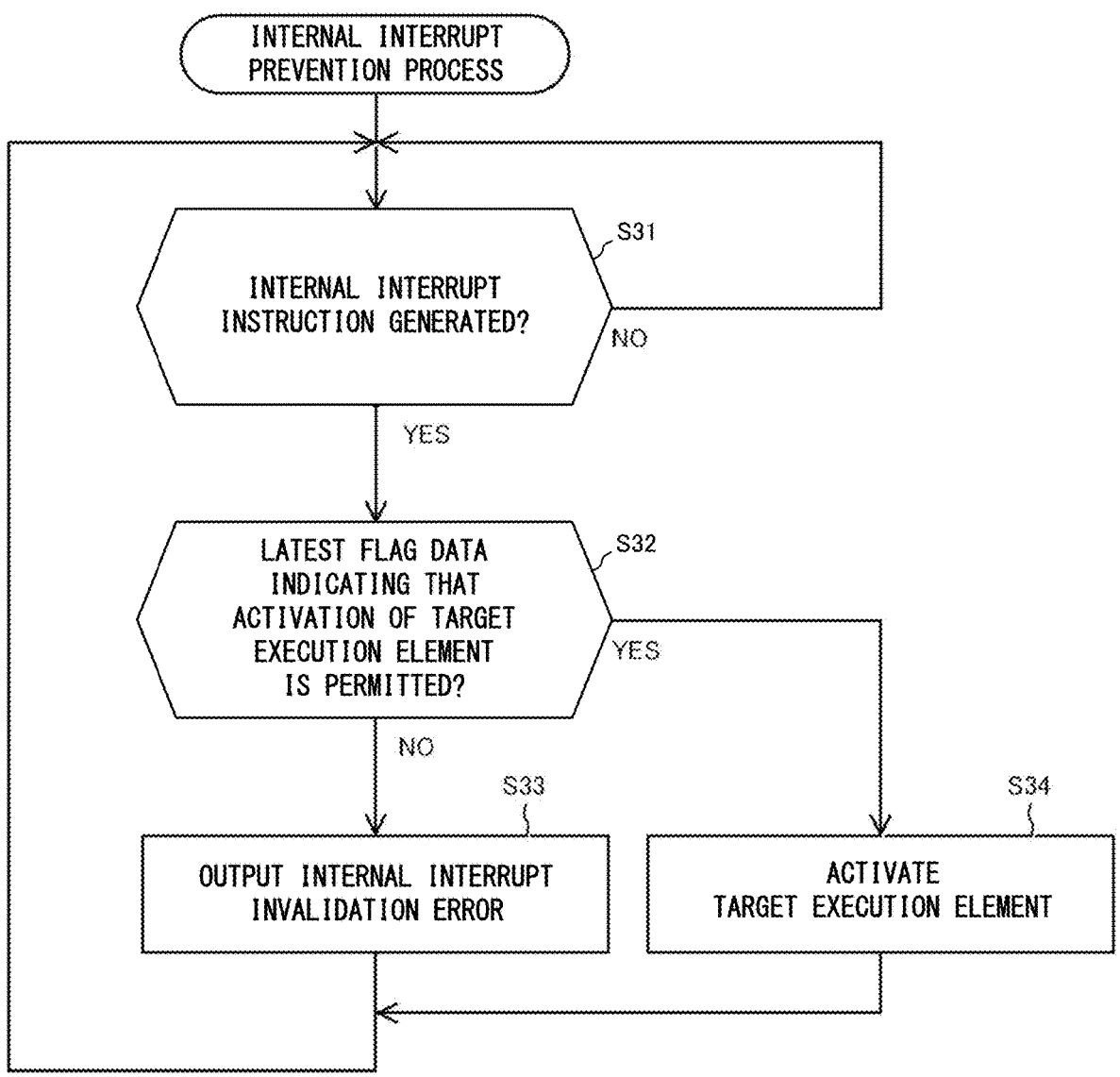
FIG. 7 is a flowchart of an internal interrupt prevention process in the embodiment.

As illustrated in FIG. 7, the internal interrupt receiver 154 constantly determines whether the internal interrupt instruction IR2 is generated (step S31). When no internal interrupt instruction IR2 is generated (No in step S31), the processing returns to step S31.

When the internal interrupt instruction IR2 is generated (Yes in step S31), the internal interrupt receiver 154 receives the internal interrupt instruction IR2. The internal interrupt preventer 155c then determines whether the latest flag data 130 indicates that the activation of the block BL1 being the target execution element is permitted (step S32).

When the latest flag data 130 indicates that the activation of the target execution element is prohibited (No in step S32), the internal interrupt preventer 155c maintains the inactive state of the block BL1 that is the target execution element. The internal interrupt preventer 155c also outputs the internal interrupt invalidation error ER3 indicating that the internal interrupt instruction IR2 is invalidated to the programmable display 200 and the executor 156 (step S33).

In contrast, when the latest flag data 130 indicates that the activation of the target execution element is permitted (Yes in step S32), the executor 156 activates the block BL1 that is the target execution element (step S34). After steps S33 and S34, the processing returns to step S31 again.

As described above, with the flag data 130 indicating that the activation of the target execution element is prohibited, the structure according to the present embodiment can maintain the inactive state of the target execution element when the external interrupt instruction IR1 is generated, when the internal interrupt instruction IR2 is generated, or when the transition condition to the target execution element is satisfied. This allows, for example, secure maintenance of the devices 300 that are controlled based on the description for the target execution element, or secure debugging of the target execution element. After maintenance or debugging, the flag data 130 may be updated to permit the activation of the target execution elements.

The embodiment are described above. The embodiment may be modified in the following manners.

In the structure according to the above embodiment, the flag data 130 sets whether to activate the block BL1. The second execution element in an aspect of the present disclosure is not limited to the block BL1. The target execution element to be the target of activation setting may be any execution element. In other words, the flag data 130 can set whether to activate any of the execution elements included in the sequence program 110, and the processes illustrated in FIG. 5 to 7 can be performed on the execution element for which the activate setting is set. The flag data 130 may thus include execution element identification information identifying the execution element for which the activation setting is set and activation information indicating whether to activate the execution element, and update the activation information as appropriate.

FIG. 1 illustrates the programmable display 200 as an example of the human machine device in an aspect of the present disclosure. The human machine device may not be the programmable display 200, but may be any device that can instruct, when receiving an operation to indicate the update of the flag data 130 from the user, the flag data update receiver 151 to update the flag data 130 based on the operation. The human machine device may be a computer called an engineering tool that provides the user with an environment for creating the sequence program 110.

FIG. 3 illustrates an example sequence program 110 written in the sequential function chart. The sequence program 110 may be written in any language that includes execution elements and transition condition elements, other than the sequential function chart.

The active state control program 120 illustrated in FIG. 2 may be installed in an existing PLC to allow the PLC to function as the PLC 100 according to the embodiment. The active state control program 120 may be distributed through a communication network, or may be stored in a non-transitory computer-readable recording medium and distributed.

The foregoing describes some example embodiments for explanatory purposes. Although the foregoing discussion has presented specific embodiments, persons skilled in the art will recognize that changes may be made in form and detail without departing from the broader spirit and scope of the invention. Accordingly, the specification and drawings are to be regarded in an illustrative rather than a restrictive sense. This detailed description, therefore, is not to be taken in a limiting sense, and the scope of the invention is defined only by the included claims, along with the full range of equivalents to which such claims are entitled.

REFERENCE SIGNS LIST

100 Programmable logic controller
110 Sequence program
120 Active state control program
130 Flag data
140 Storage
150 Processor
151 Flag data update receiver
152 Transition condition determiner
153 External interrupt receiver
154 Internal interrupt receiver
155 Preventer
155a Transition preventer
155b External interrupt preventer
155c Internal interrupt preventer
156 Executor
160 Communication device
200 Programmable display (human machine device)
210 Display screen
300, 300A, 300B, 300C, 300D, 300E, 300F Device
400 Sequence control system
CL Communication line
CV Conveyor
CVa Main line
CVb Selection line
ST0 Step (first execution element)
ST1 Step
ST2 Step
ST3 Step ST4 Step
ST5 Step
ST6 Step
ST7 Step (calling execution element)
TR1 Transition (transition condition element)
TR2 Transition
TR3 Transition
TR4 Transition
TR5 Transition
TR6 Transition
TR7 Transition
TR8 Transition
TR9 Transition
TRi0 Transition
TR11 Transition
BL1 Block (second execution element)
BL2 Block (branch execution element)
SS Selection sequence
IR1 External interrupt instruction
IR2 Internal interrupt instruction
ER1 Transition invalidation error
ER2 External interrupt invalidation error
ER3 Internal interrupt invalidation error

The invention claimed is:

1. A programmable logic controller for executing a sequence program, the sequence program including a first execution element defining a preceding action, a second execution element defining a subsequent action to be performed subsequently to the preceding action, and a transition condition element defining a transition condition for transition of an active state from the first execution element to the second execution element, the programmable logic controller comprising:
 a flag data update receiver to receive an update of flag data indicating whether activation of the second execution element is permitted or prohibited;
 an interrupt receiver to receive an interrupt instruction indicating a request for activating the second execution element independently of whether the transition condition is satisfied;
 an interrupt preventer to refer to latest flag data when the interrupt receiver receives the interrupt instruction, and to maintain, when the flag data indicates that the activation of the second execution element is prohibited, an inactive state of the second execution element and output an interrupt invalidation error indicating that the interrupt instruction is invalidated; and
 an executor to activate the second execution element when the interrupt receiver receives the interrupt instruction and the latest flag data indicates that the activation of the second execution element is permitted.

2. The programmable logic controller according to claim 1, wherein
 the interrupt receiver includes an external interrupt receiver to receive an external interrupt instruction being the interrupt instruction from outside the programmable logic controller,
 the interrupt preventer includes an external interrupt preventer to refer to the latest flag data when the external interrupt receiver receives the external interrupt instruction, and to maintain, when the flag data indicates that the activation of the second execution element is prohibited, the inactive state of the second execution element and output, as the interrupt invalidation error, an external interrupt invalidation error indicating that the external interrupt instruction is invalidated, and
 the executor activates the second execution element when the external interrupt receiver receives the external interrupt instruction and the latest flag data indicates that the activation of the second execution element is permitted.

3. The programmable logic controller according to claim 2, wherein
 the sequence program includes a branch execution element included, together with the second execution element, in a selection sequence, and the branch execution element is activated alternatively to the second execution element,
 the external interrupt instruction requests switching the active state from the branch execution element to the second execution element, and
 the external interrupt preventer refers to the latest flag data when the external interrupt receiver receives the external interrupt instruction, and maintains, when the flag data indicates that the activation of the second execution element is prohibited, the active state of the branch execution element to prevent the activation of the second execution element.

4. The programmable logic controller according to claim 1, wherein
 the sequence program includes a calling execution element different from the first execution element and the second execution element and including an activation code describing the activation of the second execution element independently of whether the transition condition is satisfied,
 the interrupt receiver includes an internal interrupt receiver to receive, when the calling execution element is activated, an internal interrupt instruction being the interrupt instruction indicating the activation of the second execution element upon execution of the activation code,
 the interrupt preventer includes an internal interrupt preventer to refer to the latest flag data when the internal interrupt receiver receives the internal interrupt instruction, and to maintain, when the flag data indicates that the activation of the second execution element is prohibited, the inactive state of the second execution element and output, as the interrupt invalidation error, an internal interrupt invalidation error indicating that the internal interrupt instruction is invalidated, and
 the executor activates the second execution element when the internal interrupt receiver receives the internal interrupt instruction and the latest flag data indicates that the activation of the second execution element is permitted.

5. The programmable logic controller according to claim 1, further comprising:
 a transition condition determiner to determine whether the transition condition defined in the transition condition element is satisfied after the preceding action is performed; and
 a transition preventer to refer to the latest flag data when the transition condition determiner determines that the transition condition is satisfied, and maintain, when the flag data indicates that the activation of the second execution element is prohibited, the active state of the first execution element to prevent the activation of the second execution element,
 wherein the executor activates the second execution element when the transition condition determiner determines that the transition condition is satisfied and the latest flag data indicates that the activation of the second execution element is permitted.

6. A sequence control system, comprising:
the programmable logic controller according to claim 1; and
a human machine interface to receive an operation to indicate the update of the flag data, and to instruct the flag data update receiver to update the flag data based on the operation.

7. A non-transitory computer readable medium storing an active state control program for a programmable logic controller to execute a sequence program, the sequence program including a first execution element defining a preceding action, a second execution element defining a subsequent action to be performed subsequently to the preceding action, and a transition condition element defining a transition condition for transition of an active state from the first execution element to the second execution element, the active state control program causing the programmable logic controller to function as:
a flag data update receiver to receive an update of flag data indicating whether activation of the second element is permitted or prohibited;
an interrupt receiver to receive an interrupt instruction indicating a request for activating the second execution element independently of whether the transition condition is satisfied;
an interrupt preventer to refer to latest flag data when the interrupt receiver receives the interrupt instruction, and to maintain, when the flag data indicates that the activation of the second execution element is prohibited, an inactive state of the second execution element and output an interrupt invalidation error indicating that the interrupt instruction is invalidated; and
an executor to activate the second execution element when the interrupt receiver receives the interrupt instruction and the latest flag data indicates that the activation of the second execution element is permitted.

8. The programmable logic controller according to claim 2, wherein
the sequence program includes a calling execution element different from the first execution element and the second execution element and including an activation code describing the activation of the second execution element independently of whether the transition condition is satisfied,
the interrupt receiver includes an internal interrupt receiver to receive, when the calling execution element is activated, an internal interrupt instruction being the interrupt instruction indicating the activation of the second execution element upon execution of the activation code,
the interrupt preventer includes an internal interrupt preventer to refer to the latest flag data when the internal interrupt receiver receives the internal interrupt instruction, and to maintain, when the flag data indicates that the activation of the second execution element is prohibited, the inactive state of the second execution element and output, as the interrupt invalidation error, an internal interrupt invalidation error indicating that the internal interrupt instruction is invalidated, and
the executor activates the second execution element when the internal interrupt receiver receives the internal interrupt instruction and the latest flag data indicates that the activation of the second execution element is permitted.

9. The programmable logic controller according to claim 3, wherein
the sequence program includes a calling execution element different from the first execution element and the second execution element and including an activation code describing the activation of the second execution element independently of whether the transition condition is satisfied,
the interrupt receiver includes an internal interrupt receiver to receive, when the calling execution element is activated, an internal interrupt instruction being the interrupt instruction indicating the activation of the second execution element upon execution of the activation code,
the interrupt preventer includes an internal interrupt preventer to refer to the latest flag data when the internal interrupt receiver receives the internal interrupt instruction, and to maintain, when the flag data indicates that the activation of the second execution element is prohibited, the inactive state of the second execution element and output, as the interrupt invalidation error, an internal interrupt invalidation error indicating that the internal interrupt instruction is invalidated, and
the executor activates the second execution element when the internal interrupt receiver receives the internal interrupt instruction and the latest flag data indicates that the activation of the second execution element is permitted.

10. The programmable logic controller according to claim 2, further comprising:
a transition condition determiner to determine whether the transition condition defined in the transition condition element is satisfied after the preceding action is performed; and
a transition preventer to refer to the latest flag data when the transition condition determiner determines that the transition condition is satisfied, and maintain, when the flag data indicates that the activation of the second execution element is prohibited, the active state of the first execution element to prevent the activation of the second execution element,
wherein the executor activates the second execution element when the transition condition determiner determines that the transition condition is satisfied and the latest flag data indicates that the activation of the second execution element is permitted.

11. The programmable logic controller according to claim 3, further comprising:
a transition condition determiner to determine whether the transition condition defined in the transition condition element is satisfied after the preceding action is performed; and
a transition preventer to refer to the latest flag data when the transition condition determiner determines that the transition condition is satisfied, and maintain, when the flag data indicates that the activation of the second execution element is prohibited, the active state of the first execution element to prevent the activation of the second execution element,
wherein the executor activates the second execution element when the transition condition determiner determines that the transition condition is satisfied and the latest flag data indicates that the activation of the second execution element is permitted.

12. The programmable logic controller according to claim 4, further comprising:

a transition condition determiner to determine whether the transition condition defined in the transition condition element is satisfied after the preceding action is performed; and a transition preventer to refer to the latest flag data when the transition condition determiner determines that the transition condition is satisfied, and maintain, when the flag data indicates that the activation of the second execution element is prohibited, the active state of the first execution element to prevent the activation of the second execution element, wherein the executor activates the second execution element when the transition condition determiner determines that the transition condition is satisfied and the latest flag data indicates that the activation of the second execution element is permitted.

13. The programmable logic controller according to claim 9, further comprising:

a transition condition determiner to determine whether the transition condition defined in the transition condition element is satisfied after the preceding action is performed; and a transition preventer to refer to the latest flag data when the transition condition determiner determines that the transition condition is satisfied, and maintain, when the flag data indicates that the activation of the second execution element is prohibited, the active state of the first execution element to prevent the activation of the second execution element, wherein the executor activates the second execution element when the transition condition determiner determines that the transition condition is satisfied and the latest flag data indicates that the activation of the second execution element is permitted.

14. A sequence control system, comprising:
the programmable logic controller according to claim 2; and
a human machine interface to receive an operation to indicate an update of the flag data, and to instruct the flag data update receiver to update the flag data based on the operation.

15. A sequence control system, comprising:
the programmable logic controller according to claim 3; and
a human machine interface to receive an operation to indicate an update of the flag data, and to instruct the flag data update receiver to update the flag data based on the operation.

16. A sequence control system, comprising:
the programmable logic controller according to claim 4; and
a human machine interface to receive an operation to indicate an update of the flag data, and to instruct the flag data update receiver to update the flag data based on the operation.

17. A sequence control system, comprising:
the programmable logic controller according to claim 5; and
a human machine interface to receive an operation to indicate an update of the flag data, and to instruct the flag data update receiver to update the flag data based on the operation.

18. A sequence control system, comprising:
the programmable logic controller according to claim 13; and
a human machine interface to receive an operation to indicate an update of the flag data, and to instruct the flag data update receiver to update the flag data based on the operation.

* * * * *